United States Patent [19]

Kobayashi et al.

[11] Patent Number: 4,995,286
[45] Date of Patent: Feb. 26, 1991

[54] APPARATUS FOR REMOVING FLASH FROM MOLDED PRODUCTS

[75] Inventors: Sadao Kobayashi; Hidemi Tomono; Kazunobu Yoshida, all of Shizuoka, Japan

[73] Assignee: Nihon Plast Co., Ltd., Fuji, Japan

[21] Appl. No.: 196,133

[22] Filed: Sep. 19, 1988

[30] Foreign Application Priority Data

May 22, 1987 [JP] Japan .................. 62-125397

[51] Int. Cl.$^5$ ................................ B23B 3/04
[52] U.S. Cl. ........................ 82/101; 82/47; 82/51
[58] Field of Search ............... 82/47 X, 101 R, 51 X, 82/53, 21 R, 1.12, 101

[56] References Cited

U.S. PATENT DOCUMENTS 3,763,297 10/1973 Del Piero et al. .
3,800,638 4/1974 Duikers et al. ............... 82/51
4,326,325 4/1982 Chambers et al. .
4,516,301 5/1985 Westerman, Jr. et al. ......... 82/1.1
4,782,728 11/1988 Thatcher ..................... 82/47

Primary Examiner—Frederick R. Schmidt
Assistant Examiner—Lawrence Cruz
Attorney, Agent, or Firm—Bachman & LaPointe

[57] ABSTRACT

An automatic flash removing apparatus, according to the present invention, comprises a flash removing cutter edge carried by a cutter holder. The cutter holder is movable with carrying the cutter edge relative to a molded product. On the other hand, the molded product is supported on a product support which can drive the product relative to the cutter edge so that the portion of the product having flash to be removed is placed in opposition to the cutter edge. The cutter holder is associated with a pressure regulator means for adjusting pressure to depress the cutter edge toward the product. Regulated depression pressure may avoid fluctuation of smoothness of the product after removing the flash.

20 Claims, 4 Drawing Sheets

APPARATUS FOR REMOVING FLASH FROM MOLDED PRODUCTS

BACKGROUND OF THE INVENTION

1. Field of the Invention

The present invention relates generally to an apparatus for removing flash from molded products, such as synthetic resin products, rubber products and so forth. More particularly, the invention relates to an apparatus for automatically removing flash from molded products.

2. Description of the Background Art

One of the conventional flash removing device has been disclosed in the Japanese Utility Model First (unexamined) Publication (Jikkai) Showa 57-196528. The publication discloses a manually operable flash removing tool for removing flash of resin product. The device has a biffurcated cutter edge with a heater for heating the cutter edge. The cutter edge is formed into essentially V-shaped configuration in order to guide the flash to be cut.

Though such flash removing tool can be conveniently used for removing flash on the molded or formed resin or rubber products, it requires manual operation for performing flash removal. Manual operation tends to fluctuates cutting position of the flash and force of exert on the tool for varying smoothness on the finished surface. Therefore, such manually operable flash removing tool is less efficient and cannot exhibit satisfactorily high yield. Furthermore, such conventional flash removing tool requires relatively high skill for successfully removing flash and providing satisfactorily smooth outer surface of the resin or rubber products.

SUMMARY OF THE INVENTION

Therefore, it is an object of the present invention to provide an automatic flash removing apparatus which does not require manual operation for removing flash and can hold satisfactory smoothness of the product surfaces with high yield.

In order to accomplish aforementioned and other objects, an automatic flash removing apparatus, according to the present invention, comprises a flash removing cutter edge carried by a cutter holder. The cutter holder is movable with carrying the cutter edge relative to a molded product. On the other hand, the molded product is supported on a product support which can drive the product relative to the cutter edge so that the portion of the product having flash to be removed is placed in opposition to the cutter edge.

Preferably, the cutter holder is associated with a pressure regulator means for adjusting pressure to depress the cutter edge toward the product. Regulated depression pressure may avoid fluctuation of smoothness of the product after removing the flash. According to one aspect of the invention, an apparatus for removing flash from a molded product comprises a cutter means, a cutter carrier means carrying the cutter means to a predetermined working position, at which flash is removed from the molded product, a work carrier means holding the molded product to carry to the working position and shifting the molded product at the working position to establish contact between a portion of the molded product, where flash thereof is to be removed, and the cutter means, and means for depressing the cutter means onto the portion of the molded product with a predetermined magnitude of force.

The apparatus may further comprise a heater means associated with the cutter means for heating the latter at a predetermined temperature.

Preferably, one of the cutter carrier means and the work carrier means includes a servo system for driving one of the cutter means and the work according to a preset trace with maintaining contact of the cutter means to the flash to be removed. The other of the cutter carrier means and the work carrier means supports associated one of the cutter means and the work in free movement with maintaining contact of the cutter means to the flash to be removed. The other of the cutter carrier means and the work carrier means has a locking means for locking associated one of the cutter means and the work for restricting movement thereof before engagement between the cutter means and the flash to be removed is established.

The cutter means may comprise a cutter edge with a cutter carrier rod connecting the cutter edge to the cutter carrier means, the cutter edge being secured to the cutter carrier rod in generally perpendicular fashion. The cutter edge is formed with a guide slit guiding flash to contact with the cutting edge.

According to another aspect of the invention, an apparatus for removing flash from a molded product comprises a cutter means having a cutter edge, a cutter carrier means carrying the cutter means and movable in vertical and horizontal directions, a work carrier means holding the molded product to carry to the working position and shifting the molded product at the working position to establish contact between a portion of the molded product, where flash thereof is to be removed, and the cutter means, a servo means, associated with the work carrier means, for driving the work carrier means so as to shift the portion of the product in such a manner that the cutting edge of the cutter means continuously maintains contact with flash to be removed, and means for depressing the cutter means onto the portion of the molded product with a predetermined magnitude of force.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE pREFERRED EMBODIMENT

The following discussion will be made for removing flash on a steering wheel 1 which is made of synthetic resin through forming process and serves as a work, shown in FIG. 9. As is well known, the formed steering wheel 1 has a boss section 2 to engage with a top end of a steering shaft (not shown) in a per se known manner. In the process of forming of the steering wheel 1, flashes 3, 4 and 5 are formed on the peripheral surface of the formed steering wheel.

Though the following discussion will be concentrated to removal of the flash 3, 4 and 5 on the steering wheel 1 as the work, the preferred embodiment of an automatic flash removing apparatus, according to the present invention, which will be discussed in detail hereinbelow, can successfully remove flashes on various molded products of synthetic resin and/or synthetic rubber and so forth.

Figure 1:
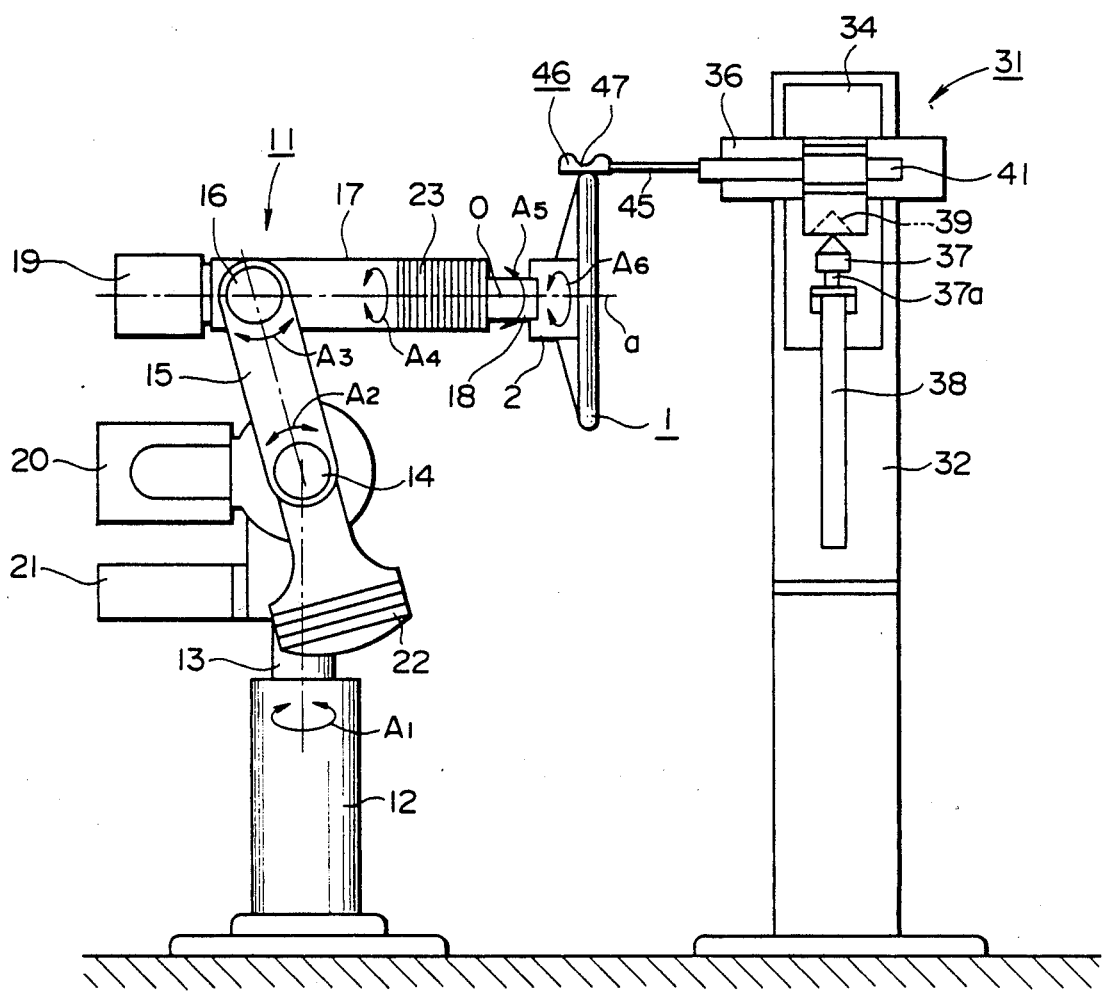
FIG. 1 is a side elevation of the preferred embodiment of an automatic flash removing apparatus according to the present invention.
Figure 3:
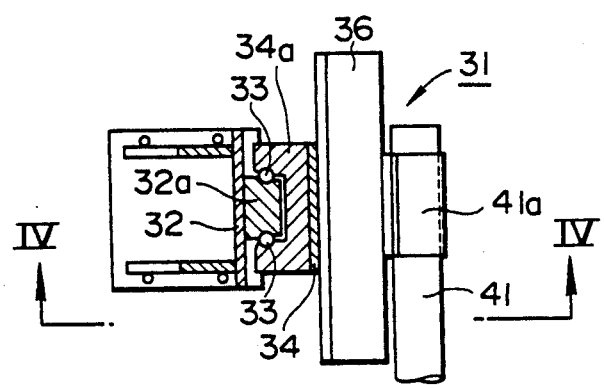
FIG. 3 is a sectional view taken along line III—III of FIG. 2.
Figure 4:
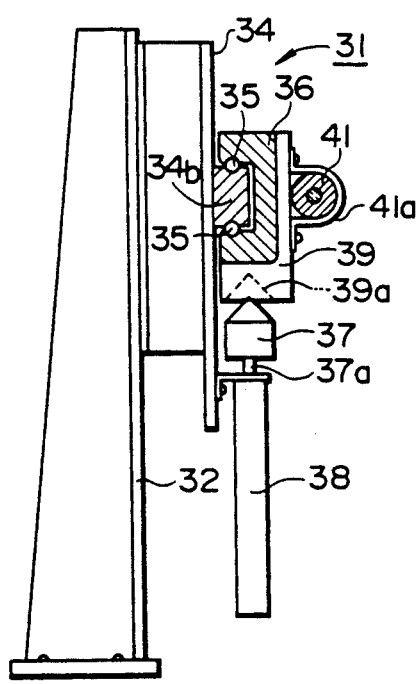
FIG. 4 is a sectional view taken along line IV—IV of FIG. 3.
Figure 2:
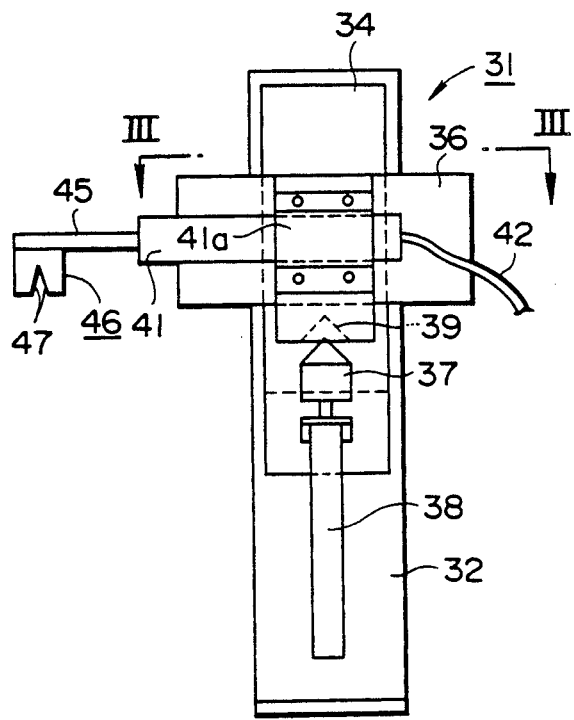
FIG. 2 is an enlarged side elevation of a cutter edge supporting structure employed in the preferred embodiment of the automatic flash removing apparatus of FIG. 1.

Referring to FIG. 1, the preferred embodiment of the automatic flash removing apparatus, according to the present invention, includes a six-axes robot 11 which carries the steering wheel 1 as the work on the working end. The robot 11 has a base 12 supporting a main shaft 13 rotatable in a direction shown by an arrow $A_1$ about a vertical axis coincident with the longitudinal axis thereof. A second shaft 14 is supported on the main shaft 13 and extends horizontally. The second shaft 14 is rotatable in a direction as indicated by an arrow $A_2$ about a horizontal axis coincident with the longitudinal axis thereof. A third shaft 16 is associated with the second shaft 14 via a pivotal arm 15 in spaced and parallel relationship to each other. A balance weight 22 is provided on the end of the pivotal arm 15 remote from the third shaft 16. The balance weight 22 normally provide force to return the neutral position of the arm 15. The third shaft 16 is also rotatable in a direction as indicated by an arrow $A_3$ about a horizontal axis extending along the longitudinal axis thereof and in parallel relationship to the horizontal axis of the second shaft 14. The third shaft 16 is associated with a fourth shaft 17 which extends horizontally and essentially in perpendicular direction to the second and third shafts 14 and 16. Similarly to the aforementioned main, the second and the third shafts 13, 14 and 16, the fourth shaft 17 is rotatable in a direction $A_4$ about a horizontal axis extending along the longitudinal axis.

As will be appreciated herefrom, in the preferred construction, the main shaft 13 is rotatable about a z-axis in a robot coordinate system for causing angular displacement of the second, third and fourth shafts 14, 16 and 17 on a horizontal plane parallel to x-y plane. The second shaft 14 rotates about a y-axis of the robot coordinate system to pivotally drive the arm 15. Pivotal movement of the arm 15 causes variation of vertical distance between the second and third shafts 14 and 16. The third shaft 16 is associated with the fourth shaft 17 and constantly maintains the fourth shaft 17 horizontal along a x-axis On the other hand, the fourth shaft 17 is driven about the x-axis.

The fourth shaft 17 has a free end carrying a chucking head assembly 18 serving as the work end. The chucking head assembly 18 is pivotable in a direction indicated by an arrow $A_5$ about a pivot 0. Furthermore, the chucking head assembly 18 is driven rotatingly in a direction indicated by an arrow A about an axis a.

In order to drive respectively the main shaft 13, the second shaft 14, the fourth shaft 17 and the chucking head assembly 18, servo motors 19, 20 and 21 are provided. The servo motor 19 is designed to rotatingly drive the fourth shaft 17 and thus drive the chucking head assembly 18 The servo motor 20 is designed to drive the second shaft 14 for adjusting height of the chucking head assembly 18. The servo motor 21 is designed to drive the main shaft 13 for adjusting the angular position of the chucking head assembly 18. In addition, another servo motor (not shown) is provided in the vicinity of the free end of the fourth shaft 17, where is covered by a cover 23. This servo motor is designed to pivotally drive the chucking head to cause pivotal movement of the chucking head in $A_5$ direction and to rotatingly drive the checking head in a direction indicated by an arrow $A_6$.

A flash removing apparatus 31 is provided in the vicinity of the aforementioned robot 11. As shown in FIGS. 1 through 4, the flash removing apparatus 31 has a support frame 32. A vertical guide 32a projects from the support frame 32. The support frame 32 supports a movable base 34 in such a manner that the movable base is vertically movable along the longitudinal axis of the support frame 32. The movable base 34 is attached to an essentially channel shaped guide block 34a. The guide block 34a engages with the vertical guide 32a for guiding vertical movement of the movable base. As FIGS. 3 and 4, a ball bearing 33 is provided on the guide block 34a for smooth movement of the movable base 34. A horizontal guide 34b is projected from the surface of the movable base 34 at an opposite side to the surface where the guide block 34a is provided. The horizontal guide 34b extends in horizontal direction perpendicular to the direction in which the vertical guide 32a extends.

An essentially channel shaped slider block 36 with a ball bearing 35 is slidably engaged with the horizontal guide 34b. An essentially L-shaped locking block 39 is rigidly fixed on the slider block 36. The locking block 39 has a locking head receptacle recess 39a on the lower surface of the horizontally extending section. On the other hand, a heater 41 is mounted on the vertically extending section of the locking block 39 by means of a bracket 41a. A rod 45 with a cutter edge 46 is connected to the heater 41 to be heated by heat generated by the heater.

In the preferred embodiment, the heater 41 may comprises an electric heater and thus connected to a conductive wire 42 connected to an electric power source.

A locking head 37 with a conical top is mounted on an actuation rod 37a which is vertically driven by means of an air cylinder 38. The locking head 37 is normally held beneath the locking head receptacle recess 39a for allowing horizontal movement of the guide block 36 with carrying the cutter edge 46 and the locking block 39. When the air cylinder 38 is actuated, the locking head 37 is driven upwardly to engage with the locking head receptacle recess 39a for preventing the slider block 36 from slidingly moving in horizontal direction.

Figure 5:
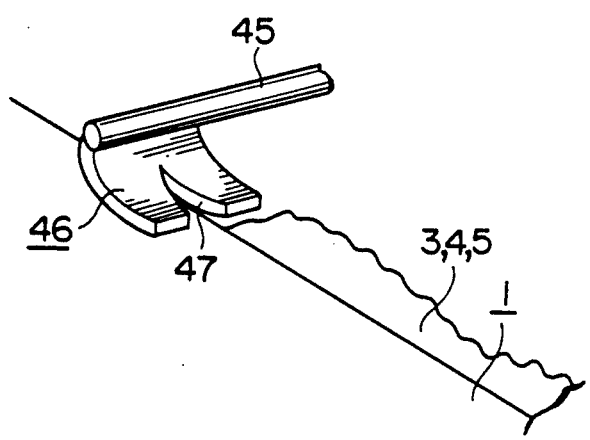
FIG. 5 is a perspective view of a cutter edge to be employed in the preferred embodiment of the automatic flash removing apparatus of FIG. 1.
Figure 6:
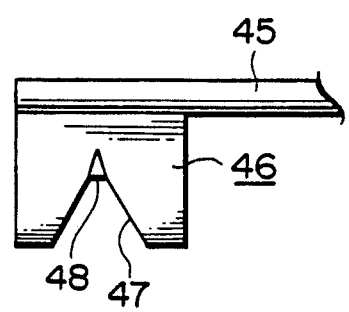
FIG. 6 is a plan view of the cutter edge of FIG. 5.

As shown in FIGS. 5 and 6, the cutting edge 46 is formed with an essentially V-shaped cut-out 47 with a cutting edge 48.

Operation of the preferred embodiment of the automatic flash removing apparatus set forth above will be discussed herebelow.

The cutter edge 46 is preliminarily heated by the heater 41 before starting flash removing operation. The heating temperature of the cutter edge 46 may be adjusted depending upon the material of the molded product from which the flash is o be removed.

Figure 9:
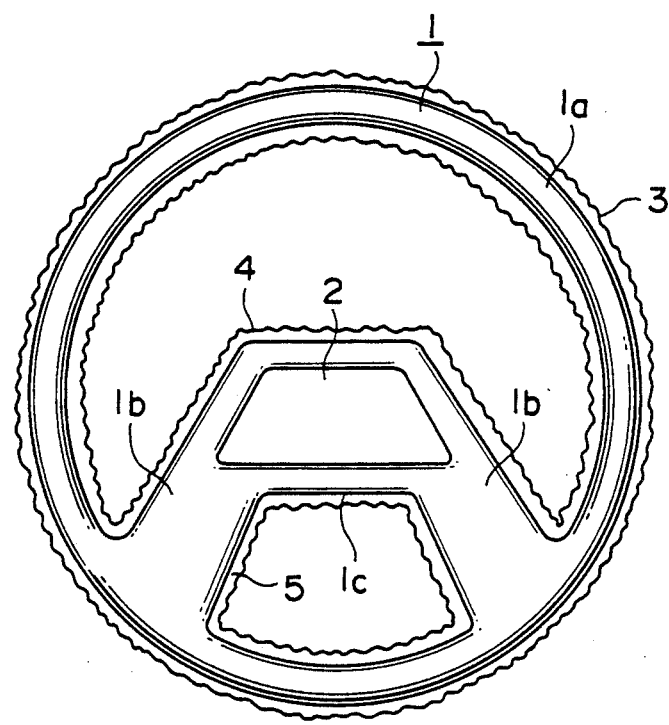
FIG. 9 is a front elevation of a steering wheel produced by resin or synthetic rubber forming and which has flash.

At this condition, the steering wheel 1 of the molded product and having flash as shown in FIG. 9 is set on the working end of the robot 11. In practice, the steering wheel 1 is chucked on the chucking head assembly. In the shown example of FIG. 9, the flash 3, the flash 4 on the inner periphery of the rim section 1a and on the upper section of spoke section 1b and center core section 1c, and the flash 5 on the inner periphery of the rim section 1a and on the lower section of spoke section 1b and center core section 1c, are to be removed. Since the position of the flash on the steering wheel 1 is known through known condition and parameters in forming process and dies to be used in forming process, the robot 11 is preliminarily programmed to place the portions having flash in a position opposing the cutter edge 46.

Simultaneously, the air cylinder 38 is actuated to lift the locking head 37 upwardly. By upward movement, the slider block 36 is locked to prevent from movement in horizontal direction. The air cylinder 38 further drives the slider block 36 with carrying the cutter edge 46 upwardly. Then, the movable base 34 with the slider block 36 shifts upwardly with carrying the cutter edge 46. By this operation, the cutter edge 46 is placed at a position where the flash removing operation is to be performed.

In the practical operation, the robot 11 carries the steering wheel 1 immediately below the cutter head 46. Then, the air cylinder 38 is deactivated to release the upward force. By this, the movable base 34 with the slider block 36 and cutter edge 46 are shifted downwardly by gravitical weight. In order to control gravitical weight, one or more weights are provided for the slider block 36. This gravitical weight serves as a force for depressing the cutter edge 46 onto the portion of the steering wheel 1 to remove the flash. Then, the flash is caught within the cut-out 47.

At this position, the air cylinder 38 is fully ventilated to lower then locking head 37 to release engagement between the locking head and the locking head receptacle recess 39a of the locking block 39. By this, the slider block 36 becomes free to move horizontally. This allows the cutter edge 46 to move vertically and horizontally with movement of the slider block 36 and the movable base 34 so as to maintain engagement between the cutter edge and the flash.

In case of removal of the flash 3 of the steering wheel, the servo motor 19 is driven at this position to rotatingly drive the steering wheel 1. At this time, since the cutter edge 46 can be held in contact with the outer periphery of the steering wheel 1 with a suitable constant pressure which corresponds to the gravitical weight of the movable base 34, the slider block 36, the heater 41 and so forth. Therefore, the flash 3 is successfully removed.

When, the flashes 4 and 5 are also removed by the cutter edge 46. In this case, robot 11 carries the steering wheel 1 to receive the cutter edge 46 within the associated openings of the steering wheel. During removal of the flashes 4 and 5, respective main, second, fourth shafts are driven according to preset program relative to the cutter edge 46. As a result, the flashes 3, 4 and 5 can be successfully removed.

With the construction set forth above, automatic flash removal can be facilitated to improve production efficiency. Furthermore, since the depression force with which the cutter head 46 is depressed on to the work surface can be held constant and can be adjusted, the flash removed surface can be satisfactorily smooth. In addition, since the cutter edge 46 is freely movable with respect to the portion of the steering wheel to remove the flash without any substantial resistance, the cutter edge can constantly follow the flast with maintaining engagement with flast to remove. Therefore, no adjustment of the position of the cutter edge is required.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 7:
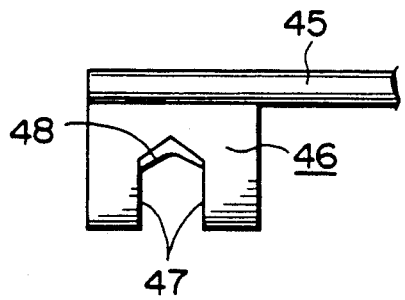
FIGS. 7 and 8 are plan views showing modifications of the cutter edges which can be employed in the automatic flash removing apparatus of FIG. 1, in place of the cutter edge of FIGS. 5 and 6.
Figure 8:
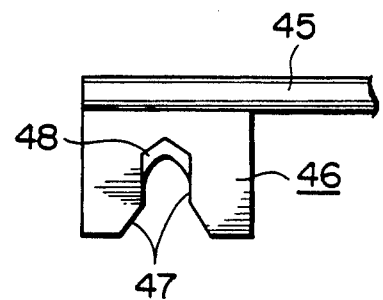

For example, though the shown embodiment of the automatic flash removing apparatus employs the cutter edge with essentially V-shaped cut-out for guiding the flash to the cutting edge, the configuration of the cut-out is variable depending upon the products from which the flash is to be removed and upon the width and thickness of the flashes, as shown in FIGS. 7 and 8.

What is claimed is:

1. An apparatus for removing flash from a molded product comprising:
    a cutter means;
    a cutter carrier means for carrying said cutter means to a predetermined working position at which flash is removed from said molded product, said carrier means being supported in free movement;
    a work carrier means for holding said molded product, for moving said molded product to said working position and for shifting said molded product relative to said cutting means at said working position to establish contact between a portion of said molded product where flash thereof is to be removed and said cutter means; and
    means for depressing said cutter means onto said portion of said molded product with a predetermined magnitude of force.

2. An apparatus as set forth in claim 1, which further comprises a heater means associated with said cutter means for heating the latter at a predetermined temperature.

3. An apparatus as set forth in claim 1, wherein said work carrier means includes a servo system for driving said work according to a preset trace while maintaining contact of said cutter means to said flash to be removed.

4. An apparatus as set forth in claim 3, wherein said work carrier means supports said cutter means in free movement while maintaining contact of said cutter means to said flash to be removed.

5. An apparatus as set forth in claim 4, wherein said cutter carrier means has a locking means for locking said cutter means for restricting movement thereof before engagement between said cutter means and said flash to be removed is established.

6. An apparatus as set forth in claim 1, wherein said cutter means comprises a cutter edge with a cutter carrier rod connecting said cutter edge to said cutter carrier means, said cutter edge being secured to said cutter carrier rod in generally perpendicular fashion.

7. An apparatus as set forth in claim 6, wherein said cutter edge is formed with a guide slit guiding flash to contact with said cutting edge.

8. An apparatus for removing flash from a molded product comprising:
a cutter means having a cutter edge:
a cutter carrier means carrying said cutter means and movable in vertical and horizontal directions;
a work carrier means holding said molded product to carry to said working position and shifting said molded product at said working position to establish contact between a portion of said molded product, where flash thereof is to be removed, and said cutter means;
a servo means, associated with said work carrier means, for driving said work carrier means so as to sift said portion of the product in such a manner that said cutting edge of said cutter means continuously maintains contact with flash to be removed; and
means for depressing said cutter means onto said portion of said molded product with a predetermined magnitude of force.

9. An apparatus as set forth in claim 8, which further comprises a heater means associated with said cutter means for heating the latter at a predetermined temperature.

10. An apparatus as set forth in claim 9, wherein said cutter carrier means has a locking means for locking associated said cutter means before engagement between said cutter means and said flash to be removed is established.

11. An apparatus as set forth in claim 8, wherein said cutter means further includes a cutter carrier rod connecting said cutter edge to said cutter carrier means, said cutter edge being secured to said cutter carrier rod in generally perpendicular fashion.

12. An apparatus as set forth in claim 11, wherein said cutter edge is formed with a guide slit guiding flash to contact with said cutting edge.

13. An apparatus for removing flash from a molded product comprising:
a cutter means;
a support;
a cutter carrier means for carrying said cutter means, and said cutter carrying means being supported on said support for free movement with respect thereto, said cutter carrier means being movable relative to said molded product in such a manner that said cutter means is oriented in cutting engagement with the flash and is movable along a circumferential surface of said product while maintaining cutting engagement; and
a work carrier means for holding said molded product, for carrying said molded product to said working position and for shifting said molded procut at said working position to establish said cutting engagement between said flash and said cutter means, said work carrier means driving said molded product so as to cause relative displacement between said cutter means and said product along said flash through the entire circumference of said product.

14. An apparatus for removing flash from a molded product comprising:
a cutter means;
a support;
cutter carrier means for carrying said cutter means, said cutter carrying means being supported on said support for free movement with respect thereto, said cutter carrier means being movable relative to said molded product in such a manner that said cutter means is oriented in cutting engagement with the flash and is movable along a circumferential surface of said molded product while maintaining cutting engagement; and
a work carrier means for holding said molded product, for carrying said molded product to said working position and for shifting said molded product at said working position to establish said cutting engagement between said flash and said cutter means, said work carrier means driving said molded product so as to cause relative angular displacement between said cutter means and said product along said flash through the entire circumference of said product.

15. An apparatus as set forth in claim 1, wherein said work carrier means comprises a robot having a base, a first shaft supported by said base and rotatable about a first axis, a second shaft supported on said first shaft and rotatable about a second axis substantially perpendicular to said first axis, and a third shaft supported by said second shaft and rotatable about a third axis substantially transverse to both said first and second axes.

16. An apparatus as set forth in claim 15, wherein said robot further comprises a fourth shaft rotatable about an axis substantially parallel to said second axis.

17. An apparatus as set forth in claim 16, wherein said second and fourth shafts are connected by a pivotably movable arm and said robot further comprises a balance weight provided on an end of said pivotably movable arm so as to provide a force for returning said arm to a neutral position.

18. An apparatus as set forth in claim 16, wherein said third shaft has a pivotable chucking head assembly at a free end, said chucking head assembly being rotatable about an axis substantially coincident with said third axis.

19. An apparatus as set forth in claim 18, wherein said robot further comprises a first servo motor for driving said third shaft and said chucking head assembly, a second servo motor for driving said second shaft and thereby adjusting the height of said chucking head assembly relative to said base, and a third servo motor for driving said first shaft and thereby adjusting the angular position of the chucking head assembly relative to said base.

20. An apparatus as set forth in claim 1, wherein said work carrier means comprises a six axes robot which carries said molded product on a working end.

* * * * *

UNITED STATES PATENT AND TRADEMARK OFFICE
CERTIFICATE OF CORRECTION

PATENT NO. : 4,995,286
DATED : FEBRUARY 26, 1991
INVENTOR(S) : SADAO KOBAYASHI ET AL.

It is certified that error appears in the above-identified patent and that said Letters Patent is hereby corrected as shown below:

IN COLUMN 1, LINE 11, DELETE "RE'MOVING" AND INSERT --REMOVING--.

IN COLUMN 1, LINE 58, AFTER "FLASH." DELETE "ACCORDING".

IN COLUMN 1, LINE 59, INSERT --ACCORDING-- IN FRONT OF "TO".

IN COLUMN 3, LINE 7, DELETE "pREFERRED" AND INSERT --PREFERRED--.

IN COLUMN 4, LINE 4, DELETE "A" AND INSERT --$A_6$--.

IN COLUMN 7, CLAIM 8, LINE 20, DELETE "SIFT" AND INSERT --SHIFT--.

Signed and Sealed this

First Day of December, 1992

*Attest:*

DOUGLAS B. COMER

*Attesting Officer*  Acting Commissioner of Patents and Trademarks